Figure 3:
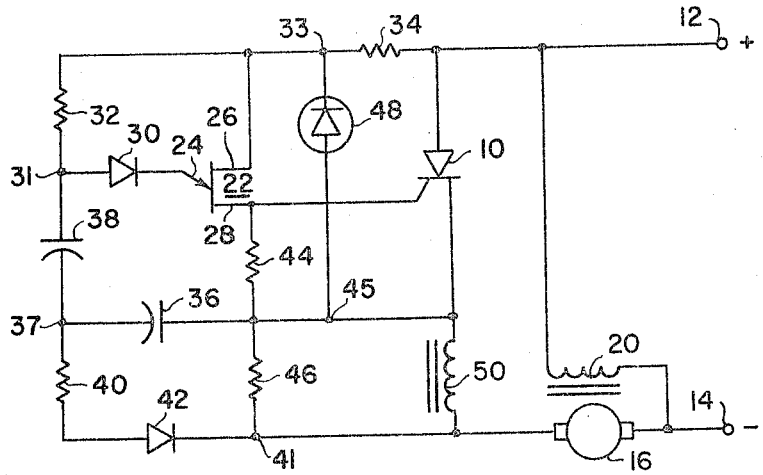

Aug. 2, 1966     D. L. BOWERS     3,264,544
COUNTER E.M.F. SPEED CONTROL
Filed June 8, 1962     4 Sheets-Sheet 1
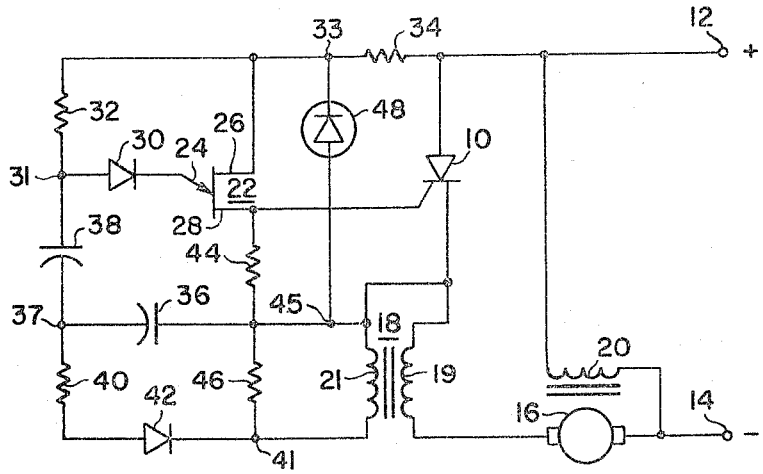
FIG. 1
FIG. 2
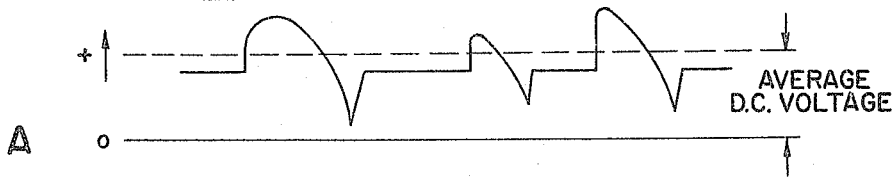
VOLTAGE WAVEFORM ACROSS MOTOR ARMATURE
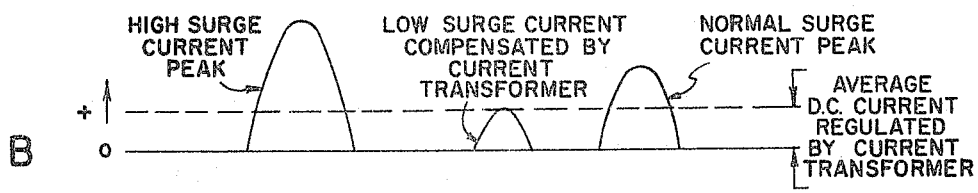
ARMATURE CURRENT WAVEFORM
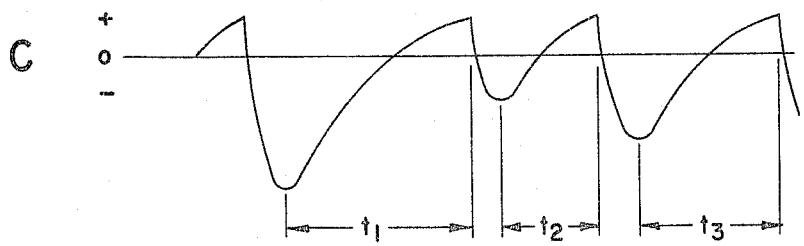
VOLTAGE WAVEFORM ACROSS CAPACITOR 36
INVENTOR.
DAVID L. BOWERS
BY Isidore Match
ATTORNEY INVENTOR.
DAVID L. BOWERS
BY Isidore Match
ATTORNEY Aug. 2, 1966    D. L. BOWERS    3,264,544
COUNTER E.M.F. SPEED CONTROL
Filed June 8, 1962    4 Sheets-Sheet 3

INVENTOR.
DAVID L. BOWERS
BY Isidore Match
ATTORNEY

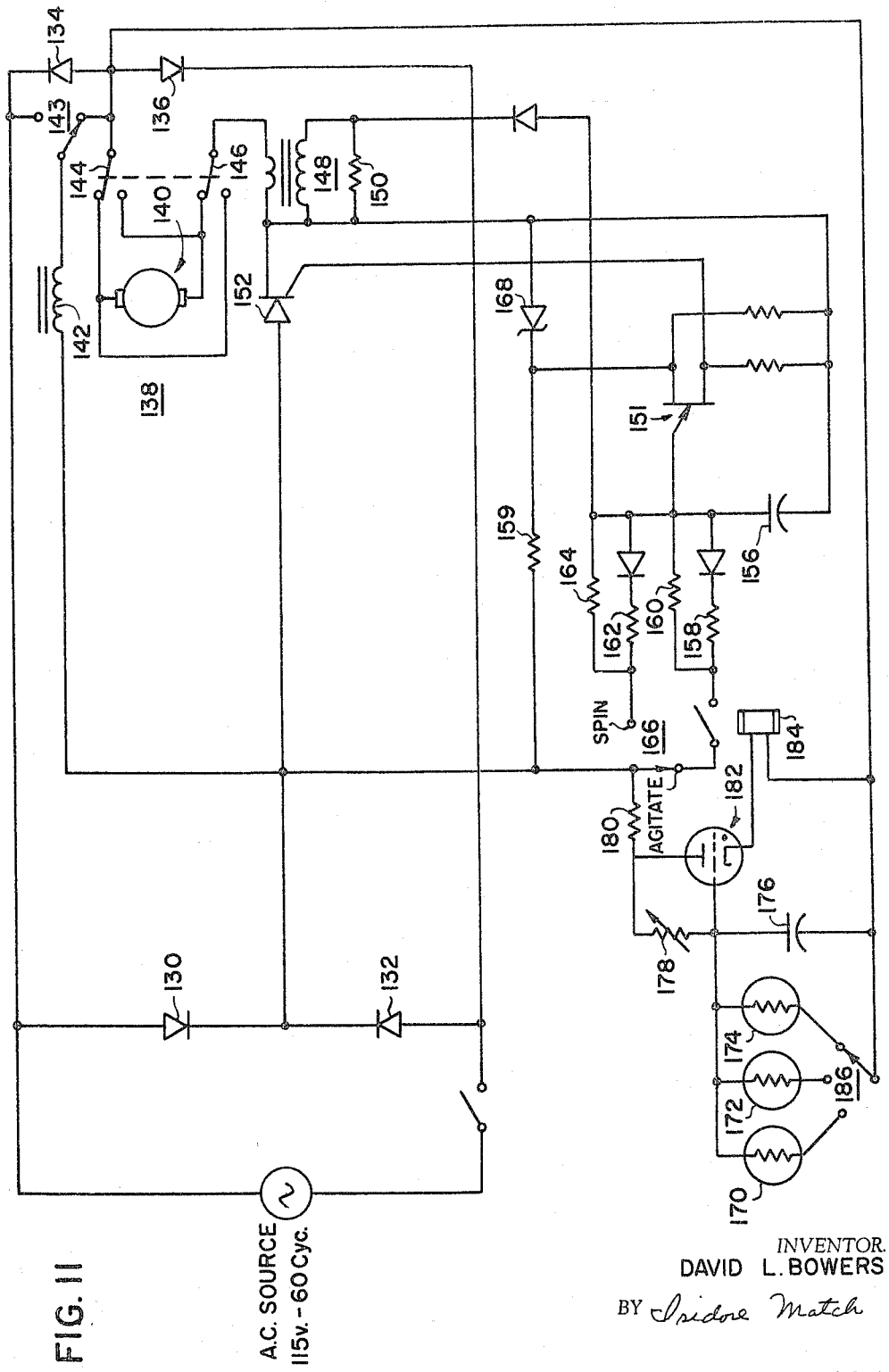

United States Patent Office 3,264,544
Patented August 2, 1966

3,264,544
COUNTER E.M.F. SPEED CONTROL
David L. Bowers, Louisville, Ky., assignor to General
Electric Company, a corporation of New York
Filed June 8, 1962, Ser. No. 200,998
10 Claims. (Cl. 318—331)

This invention relates to motor control circuits. More particularly, it relates to control circuits for D.C. motors of the shunt wound type.

In the typical washing machine, there is necessarily employed a clutch interposed between a motor and a transmission. The clutch limits the load on the motor regardless of the particular step being provided in the washing operation. Thus, for instance, when a spin operation is started, the motor speed may remain constant while the clothes tub comes up to speed fairly slowly.

In such machines, the usual practice so far has been to utilize a motor of the induction type. In these machines, the induction motor may be reversed to enable agitation for one direction of rotation and spin for the other direction of rotation, or, as another well known approach, a unidirectional motor may be provided, with additional intelligence for providing the selection of the agitate or spin operation.

It is accordingly an important object of this invention to provide a control arrangement for a shunt wound D.C. motor whereby it may be utilized to advantage in a washing machine.

It is a more specific object to provide a control arrangement in accordance with the preceding object wherein the clutch which has heretofore been interposed between the motor and transmission in a washing machine may be eliminated.

It is another more specific object to provide a control arrangement in accordance with the preceding objects wherein reversal of the shunt wound motor is enabled to provide different directions of rotation thereof.

In washing machines, it is conventional to have sensing means for determining the liquid level within a washing machine tub, such liquid sensing being utilized, for example, to halt the flow of inlet water and to initiate washing and rinsing operations.

It is, therefore, still another object of this invention to provide a motor control arrangement in accordance with the preceding objects which includes liquid level sensing means.

Generally speaking and in accordance with the invention, there is provided in an apparatus operable by a D.C. motor powered by a source of full wave rectified alternating current potential and comprising an armature, the apparatus including liquid containing means; the combination of control means for the motor and means for maintaining the liquid in the containing means at a given level comprising a gate controlled rectifier in circuit with the source and the armature. There is also provided timing means in circuit with the rectifier and the armature for periodically gating the rectifier into conductivity and regulating means in circuit with the timing means and the armature, the periods of the rectifier's conductivity being determined by the regulating means. Means are provided disposed in the liquid containing means at the aforesaid given level for effecting a flow of liquid into the containing means up to the given level when the liquid falls below such level.

The features of this invention which are believed to be new are set forth with particularity in the appended claims. The invention itself, however, may best be understood by reference to the following description when taken in conjunction with the accompanying drawings which show embodiments of control arrangements according to the invention.

Figure 4:
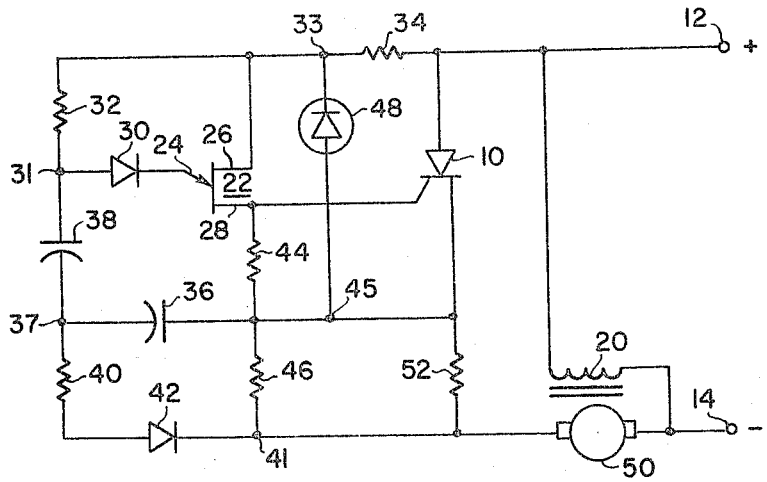
Figure 5:
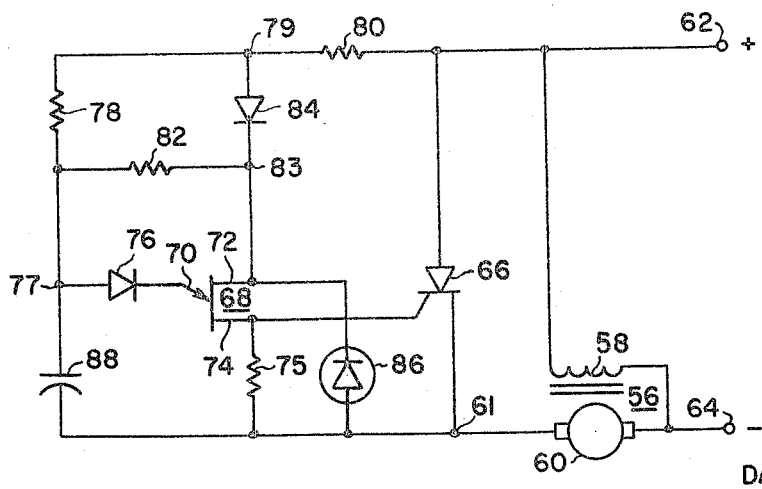
Figure 6:
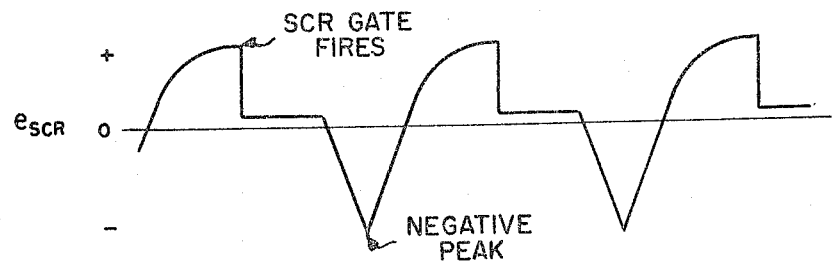
Figure 7:
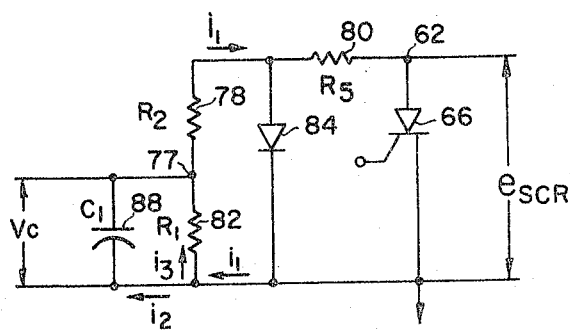
Figure 8:
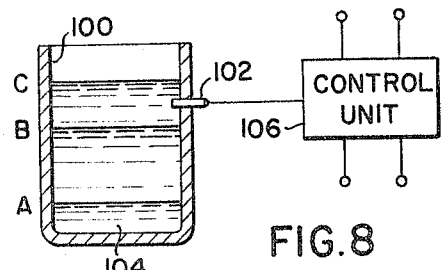
Figure 9:
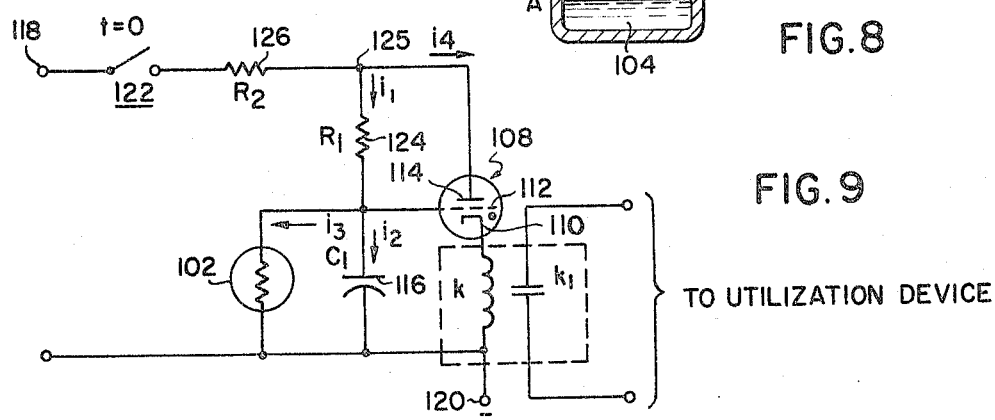
Figure 10:
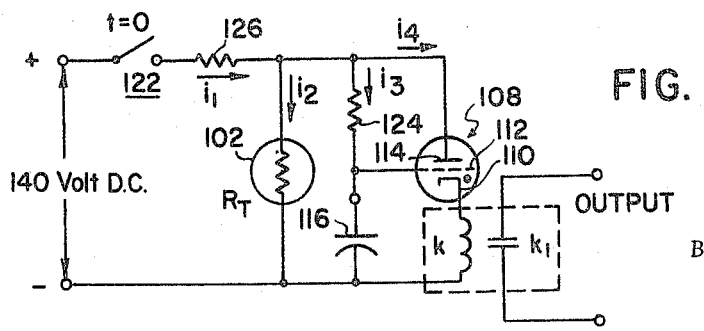

In the drawings,
FIG. 1 is a schematic diagram of an embodiment of a control circuit for a shunt wound D.C. motor in accordance with the principles of the invention;
FIG. 2 is a timing diagram of current and voltage waveforms occurring at different points in the circuit of FIG. 1;
FIG. 3 is a schematic depiction of a circuit similar to the circuit depicted in FIG. 1;
FIG. 4 is a schematic depiction of a circuit similar to the circuits depicted in FIGS. 1 and 3;
FIG. 5 is a schematic diagram of another embodiment of a control circuit for a shunt wound D.C. motor in accordance with the principles of the invention;
FIG. 6 is a graph showing an output voltage waveform in the circuit of FIG. 5;
FIG. 7 is a diagram of a circuit conveniently utilized in explaining the operation of the circuit of FIG. 5;
FIG. 8 is a conceptual diagram of a liquid level sensing arrangement;
FIG. 9 is a schematic diagram of the liquid level sensing arrangement shown in FIG. 8;
FIG. 10 is a schematic diagram of a liquid level sensing arrangement similar to that depicted in FIG. 9; and
FIG. 11 is a schematic depiction of a circuit for a washing machine which embodies the motor control and liquid sensing arrangement of this invention.

Referring now to FIG. 1 wherein there is shown an arrangement for controlling a shunt wound D.C. motor and incorporating a sensor circuit having an output proportional to motor torque and current, a silicon controlled rectifier 10 has its anode connected to the positive terminal 12 of a unidirectional potential source (not shown), its cathode being connected to the armature 16 of a shunt wound D.C. motor through the primary winding 19 of a current transformer 18, armature 16 being connected to the negative terminal 14 of the unidirectional potential source. The shunt field 20 of the motor is connected between positive and negative terminals 12 and 14 respectively. The unidirectional potential source suitably is a full-wave rectified A.C. voltage.

A unijunction transistor 22 which is utilized to trigger silicon controlled rectifier 10 into conductivity has its emitter 24 connected to terminal 12 through the cathode to anode path of a diode 30, a resistor 32 and a resistor 34. A base 26 of transistor 22 is connected to the junction 33 of resistors 32 and 34, the other base 28 of transistor 22 being connected to the gate electrode of silicon controlled rectifier 10. The anode of diode 30 is connected to one terminal of the secondary winding 21 of current transformer 18 through the series arrangement of capacitors 36 and 38, the junction 37 of capacitors 36 and 38 being connected to the other terminal of secondary winding 21 through a resistor 40 and the anode to cathode path of a diode 42. Base 28 is connected to the junction 41 of diode 42 and secondary winding 21 through the series arrangement of resistors 44 and 46, the cathode to anode path of a Zener diode 48 being interposed between junction 33 and the junction 45 of resistors 44 and 46.

Considering the operation of the circuit of FIG. 1, with the source unidirectional voltage directly across the anode to cathode path of silicon controlled rectifier 10 and unijunction transistor 22 in the nonconductive state, capacitors 36 and 38 charge to the voltage of junction 33 through resistor 32, resistor 32 and capacitors 38 and 36 comprising a time constant circuit. When the voltage at junction 31 reaches a given level, transistor 22 is rendered conductive whereby capacitors 38 and 36 discharge through diode 30, transistor 22, resistor 44 and the gate of silicon controlled rectifier 10 thereby to provide a voltage pulse to the gate electrode of silicon controlled rectifier 10 and gate silicon controlled rectifier 10 into conductivity. Consequently, current flows through silicon controlled rectifier 10, primary winding 19 and armature 16. Effectively, the voltage pulse developed across the parallel arrangement of the gate resistance of silicon controlled rectifier 10 and resistor 44 during such discharge is the pulse that gates silicon controlled rectifier 10 into conductivity. The total capacitance presented by capacitors 38 and 36, is of course, $$\frac{C_{38}C_{36}}{C_{38}+C_{36}}$$

Zener diode 48 serves to regulate the voltage between junctions 33 and 45. The voltage drop across resistor 34 allows Zener diode 48 to regulate the voltage appearing across silicon controlled rectifier 10 between positive terminal 12 and junction 45. Diode 30 serves to permit only forward current through unijunction transistor 22 and causes charging current to flow through resistor 32.

When silicon controlled rectifier 10 conducts, the voltage developed across resistor 46 is proportional to the current flowing in secondary winding 21. Transformer 18, itself offers a negligible impedance to the high current armature circuit. Capacitor 36 charges in the negative direction to the voltage appearing at junction 41 through resistor 40 and diode 42, the voltage to which capacitor 36 charges determining the degree of negative feedback. Diode 42 is so poled as to insure that capacitor 36 charges in the correct direction to provide negative feedback. Although the voltage from the potential source does not fall below zero volts, silicon controlled rectifier 10 is commutated into nonconductivity because of the inductance in armature 16 and the counter E.M.F. generated when armature 16 is rotating.

Referring now to FIG. 2, wherein there is shown a diagram of wave forms appearing across armature 16, line A thereof shows the waveform of the voltage across armature 16 during high current surges developed in the motor. Line B shows the armature current waveform.

Since the voltage across resistor 46 is proportional to the current in secondary winding 21 which is in turn proportional to the current surges in armature 16, such voltage when rectified by diode 42 appears across capacitor 36 in the form shown in line C of FIG. 2. This rectified voltage on capacitor 36 places a negative bias between emitter 24 and base 28. In line C, time $t_1$ is the time required to fire silicon controlled rectifier 10 after a large current surge through armature; time $t_2$ represents compensating time for regulation current surge and time $t_3$ represents the normal silicon controlled rectifier firing time.

A large current surge through armature 16 places an increased negative bias on capacitor 36 thereby delaying the silicon controlled rectifier firing position, i.e., increasing the firing angle for the next half cycle. If large armature current surges continue to occur, caused by a weak shunt field or an excessive load, the silicon controlled rectifier firing circuit limits the average current to a safe value and thereby effects motor current protection. The values of resistor 40 and 46 may be so chosen as to permit the selection of the maximum allowable torque and current requirements for the operating motor.

It is thus seen that the circuit of FIG. 1 provides an arrangement wherein a sensor circuit produces an output proportional to a shunt motor torque or current. In the arrangement, an adjustable time constant circuit, viz., resistor 32 and capacitors 36 and 38, controls the firing of unijunction transistor 22 which in turn determines the firing angle of silicon controlled rectifier 10. The adjustment in the time constant circuit is made by varying the charge on the capacitance therein. The timing capacitance is divided into two capacitors 36 and 38 arranged in series. A negative voltage which is impressed on one of these timing capacitors is proportional to the rate of change of current in the shunt motor armature.

In FIG. 3 wherein there is shown another embodiment of a control circuit for a shunt wound D.C. motor similar to the circuit of FIG. 1, an inductor 50 is utilized in place of current transformer 18. Since the other elements of the circuit of FIG. 3 are the same as those of FIG. 1, like designating numerals are applied to corresponding structures.

In this circuit, the voltage developed across inductor 50 and resistor 46 is proportional to the change in armature current. Otherwise, the circuit of FIG. 3 functions in a manner similar to the functioning of the circuit of FIG. 1.

In FIG. 4, there is shown a circuit similar to that of the circuits of FIGS. 1 and 3 with the exception that a resistor 52 is utilized in place of the current transformer 18 of FIG. 1 or the inductor 50 of FIG. 3. The operation of the circuit of FIG. 4 is substantially the same as the operation of the circuits of FIGS. 1 and 3 respectively. The value of resistor 52 is chosen such that the voltage drop thereacross is just sufficient to permit enough feedback voltage to be applied to capacitor 36.

In FIG. 5 wherein there is shown another embodiment of a control circuit according to the invention, a D.C. motor 56 comprises a shunt field 58 connected between the positive terminal 62 and the negative terminal 64 of a unidirectional potential source (not shown), the source suitably being a fullwave rectified A.C. voltage. The armature 60 of motor 56 is connected between negative terminal 64 and the cathode of a silicon controlled rectifier 66, the anode of silicon controlled rectifier 66 being connected to positive terminal 62.

The triggering circuit for silicon controlled rectifier 66 includes a unijunction transistor 68 having an emitter 70 connected to positive terminal 62 through the cathode to anode path of a diode 76, a resistor 78 and a resistor 80, a base 72 connected to the junction 79 of resistors 78 and 80 through the cathode to anode path of a diode 84 and to the cathode of silicon controlled rectifier 66 through the cathode to anode path of a Zener diode 86. The other base 74 of unijunction transistor 68 is connected to the cathode of silicon controlled rectifier 66 through a resistor 75 and is directly connected to the gate electrode of silicon controlled rectifier 66.

The timing circuit for unijunction transistor 68 comprises a capacitor 88 connected between the junction 77 of diode 76 and resistor 78 and a resistor 82 connected between junction 77 and base 72, i.e., junction 83.

In the circuit of FIG. 5, the parallel value of resistor 78 and resistor 82 determines the positive charging rate of capacitor 88, and resistor 82 in shunt with capacitor 88 and series resistor 78 determine the negative charging rate of capacitor 88, Zener diode 86 regulates the voltage appearing across unijunction transistor 68 and also the positive charging voltage on capacitor 88. Resistor 80 is the voltage dropping resistor for the positive charging voltage regulated by Zener diode 86, and diode 76 prevents reverse current from passing through unijunction transistor 68. Across resistor 75 is developed the voltage pulse which is applied from base 74 to the gate electrode of silicon controlled rectifier 66.

In considering the operation of the circuit of FIG. 5, when full-wave rectified potential is applied to the circuit, capacitor 88 charges in the positive direction, diode 84 being rendered conductive, to the value of the voltage regulated by Zener diode 86 through the parallel arrangement of resistor 78 and resistor 82. When the voltage at junction point 77 attains a given value, unijunction transistor 68 is rendered conductive and capacitor 88 rapidly discharges therethrough, diode 76, emitter 70 to base 74 of transistor 68 and resistor 75, the voltage pulse consequently developed thereby across resistor 75 being applied to the gate electrode of silicon controlled rectifier 66 to render it conductive. Current consequently flows through armature 60 and the voltage at the cathode of silicon controlled rectifier 66 rises to the potential at terminal 62 minus the forward drop across silicon controlled rectifier 66 plus the counter E.M.F. produced by armature 60 when it is rotating.

Consequently, the voltage at point 61 minus the forward drop across Zener diode 86 appears at junction 83. This permits capacitor 88 to charge in the negative direction, negative charging current flowing through resistors 78, 80 and 82, resistor 82 shunting part of the current to capacitor 88, the amount of shunted current depending upon the value chosen for resistor 82.

FIG. 6 shows the voltage waveform apperaing across silicon controlled rectifier 66 during normal operation. In this figure, the negative silicon controlled rectifier voltage $e_{scr}$ is substantially the motor armature generated voltage (counter E.M.F.) subtracted from the potential at positive terminal 62.

The generation of the silicon controlled rectifier negative voltage is more readily understood in conjunction with the circuit of FIG. 7. In this circuit, it is noted that the silicon controlled rectifier negative voltage appears across diode 84 and charges capacitor 88 in the reverse direction. It is seen in this circuit that:

$$i_1 = i_2 + i_3$$

and that $$\frac{e_{scr} - V_c}{R_2 + R_5} = i_2 + \frac{V_c}{R_1}$$

wherein $e_{scr}$ is the negative silicon controlled rectifier voltage.

Accordingly, current $i_2$ charging capacitor $C_1$ is:

$$i_2 = \frac{e_{scr} - V_c}{R_2 + R_5} - \frac{V_c}{R_1} \quad (1)$$

The degree of speed regulation is achieved by varying resistor 82 ($R_1$) which varies the reverse negative charging time constant. Speed selection for the motor is determined by the value of resistor 78 ($R_2$) which controls the positive charging current supplied to capacitor 88.

The peak negative voltage $e_{scr}$ as shown in FIG. 7 is substantially equal to the motor generative voltage (counter E.M.F.) across armature 69 when the supply voltage is zero (substantially instantaneously). The motor speed is directly proportional to the motor generative voltage and the peak negative silicon controlled rectifier voltage. Therefore, if the peak negative silicon controlled rectifier voltage is maintained at a constant value independent of output load variations, speed regulation is accomplished. Essentially, the circuit shown in FIG. 7 effects the regulation of the peak negative silicon controlled rectifier voltage by controlling the amount of negative charging current $i_2$ to capacitor 88, and controlled by resistor 82.

Speed regulation for the circuit of FIG. 7 is maintained relatively constant over high and low motor speed operation if proper values for the circuit components are selected. The selection of the desired values can be done by analyzing the reverse charging current $i_2$ as expressed in Equation 1 as follows:

The current $i_2$ charging capacitor $C_1$ is given by $$i_1 = i_2 + i_3$$

$$\frac{e_{scr} - V_c}{R_2 + R_5} = i_2 + \frac{V_c}{R_1}$$

$$i_2 = \frac{e_{scr} - V_c}{R_2 + R_5} - \frac{V_c}{R_1}$$

$$i_2 = \frac{R_1(e_{scr} - V_c) - V_c(R_2 + R_5)}{R_1(R_2 + R_5)}$$

$$= \frac{R_1 e_{scr} - V(R_2 + R_5 + R_1)}{R_1(R_2 + R_5)}$$

Let it be assumed that $R_2 + R_5 = K$ (constant)

$$i_2 = \frac{1}{K}\left[e_{scr} - \frac{V_c(K + R_1)}{R_1}\right] \quad (2)$$

Since $V_c = \int i_2 dt$, then $$i_2 + \int \frac{i_2 dt}{KR_1}(K + R_1) = \frac{e_{scr}}{K} \quad (3)$$

Thus, assuming two speed operation, at high speed, the value of resistor 82 is chosen to be low and the silicon controlled rectifier negative peak voltage is high. At low speed, the value of resistor 82 is chosen to be high and the negative peak voltage of silicon controlled rectifier 66 is low. Thus Equations 2 and 3 enable the selection of desired values for resistors 82 and 78 to effect speed regulation over a desired range.

From the foregoing, it is seen that in accordance with the principles of the invention, there is provided a motor control arrangement wherein the motor may be made to rotate at various speeds with the proper current control. Such variable speed control enables the elimination of a clutch which, heretofore has been required in motor operated washing machines.

In FIG. 8, there is shown the relationship of a sensing device 102 in a tub 100 containing a liquid 104 such as water and a control unit 106 whose operation is responsive to the sensing device.

In FIG. 9 wherein there is shown the combination of the sensing device 102 of FIG. 8 which is a thermistor and the elements comprising control unit 106, a thyratron 108 comprises a cathode 110 connected to the negative terminal 120 of a D.C. source (not shown) through the operating coil of a relay K, relay K suitably being a magnetic reed relay. The control grid 112 of thyratron 108 is connected to negative terminal 120 through the parallel arrangement of thermistor 102 and a capacitor 116 and is connected to the rotor of a switch 122 through a resistor 124 and a resistor 126. The anode 114 of thyratron 108 is connected to the junction 125 of resistors 124 and 126, the fixed pole of switch 122 being connected to the positive terminal 118 of the D.C. source.

In considering the operation of the circuit of FIG. 9, with switch 122 open and the water level in tub 100 at point A, thermistor 102 is in the "cold" state and exhibits high resistance. Now, when switch 122 is closed at time $t_0$, current flows through resistors 126 and 124. At this time since thermistor 102 exhibits a high resistance and therefore substantially does not shunt current $i_1$ ($i_1 \approx i_2$), capacitor 116 charges. If the voltage across capacitor 116 attains the firing voltage for thyratron 108 which may suitably be about 70 volts, D.C., thyratron 108 is rendered conductive whereby current $i_4$ flows through thyratron 108, thereby energizing relay 120, normally open contacts $K_1$ associated with relay K closing to actuate a utilization device not shown.

When no water or other liquid is in contact with thermistor 102 in tub 100, a high temperature heat conduction path or gradient exists between the circumambient air and thermistor 102, permitting the thermistor to increase in temperature caused by self-heating. The self-heating current to the thermistor is $i_3 = i_1 - i_2$. An increase in thermistor temperature gives a decrease in the resistance of the thermistor and this resistance change starts shunting current around capacitor 116. If the charge on capacitor 116 has not reached a value sufficient to fire thyratron 108, thermistor 102 provides a shunt for discharging capacitor 116.

The resistance value of thermistor 102 stabilizes at a value determined by its ambient self-heating temperature. The circuit remains in this state until a change in circuit parameters occur. The operation of the circuit depends on the small thermistor thermal time lag $T_T$ compared with the firing circuit time constant, $T_c$ which equals $(R_2 + R_1)C_1$. A small thermal time lage $T_T$ necessitates that the thermistor have low mass and sufficient heating current.

When the water level in tub 100 increases between points B and C, the self-heating temperature of thermistor 102 is reduced (assuming, of course, that the temperature of the water in tub 100 is well below the thermistor's self-heating temperature). Consequently, the resistance of thermistor 102 increases thereby limiting the curent $i_3$ which in turn increases the charging current $i_2$. Since the shunt resistance of thermistor 102 is high at this time thereby permitting the charge on capacitor 116 to increase in voltage to the value approaching the firing voltage of thyratron 108, thyratron 108 is rendered conductive whereby current $i_4$ flows through the operating coil of magnetic reed relay K. Contacts $K_1$ consequently close thereby actuating the utilization device.

It is desirable that the voltage drop across resistor 126 be less than the supply voltage minus the total of the voltage required for firing thyratron 108 and the voltage drop across the operating coil of relay K in accordance with the equation.

$$R_2(i_4+i_1) = \text{Supply voltage} - (V_{\text{thyratron}} + V_{\text{relay}})$$

When the water level in tub 100 (FIG. 8) drops below level B, the resistance of thermistor 102 decreases thereby discharging capacitor 116, increasing the current $i_1$ and increasing the voltage drop across resistor 126, $[R_2(i_1+i_4)]$, to a value where thyratron 108 is extinguished and relay contacts $K_1$ open. The circuit is now ready for another cycle of operation dependent upon the water level in tub 100.

In FIG. 10 wherein there is shown an arrangement similar to the arrangement of FIG. 9, thermistor 102 is connected in shunt with the series arrangement of resistor 124 and capacitor 116.

The operation of the circuit of FIG. 10 is substantially similar in principle to the operation of the circuit of FIG. 9. In such operation, when thermistor 102 is in the "cold" state and accordingly has a "high" resistance, the current relationships are $i_2 \approx 0$, $i_1 \approx i_3$ and therefore the voltage drop across resistor 126 is relatively "small." Most of the source voltage is applied across the thyratron circuit and capacitor 116 charges through resistor 124 toward the firing voltage for thyratron 108.

If thermistor 102 self-heats, its resistance $R_T$ decreases thereby increasing the current $i_2$ and causing an increased voltage drop across resistor 126. When the voltage drop across resistor 126 is great enough to reduce the voltage across thyratron 108 below its firing voltage level (assuming, of course, that the resistor 124, capacitor 116 time constant circuit did not fire thyratron 108), the circuit is in a stable state. The thermistor thermal time lag $T_T$ has to be smaller than the resistor 124, capacitor 116 firing time constant.

A water level change between levels B and C in tub 100 (FIG. 8) quenches the thermistor temperature, increases the resistance of thermistor 102 ($R_T$), decreases the voltage drop across resistor 126, increases the voltage across thyratron 108 charges resistor 124 and capacitor 116. Current through thyatron 108 will effect the energization of the operating coil of relay K with the consequent closing of contacts $K_1$.

The circuit of FIG. 10 permits the use of a less sensitive thermistor than that used in the circuit of FIG. 9, permits an increase in the thermistor mass because of increased current $i_2$ and better circuit control is provided in the firing of thyratron 108.

In FIG. 11, diodes 130, 132, 134 and 136 comprise a full-wave rectifier for providing full-wave rectified A.C. potential to a motor 138 which comprises an armature 140 and a shunt field 142. Ganged switches 144 and 146 are included to permit reversal of motor 138. A switch 143 permits high and low speed operation. Current transformer 148 senses the current in armature 140 and across resistor 150, there is developed a voltage proportional to this current. Silicon controlled rectifier 152 provides current surges to armature 140 as previously described in connection with the circuit of FIG. 1.

The triggering circuit for silicon controlled rectifier 152 comprises a unijunction transistor 154 and the time constant circuit comprising capacitor 156 and either resistors 158, 159 and 160 or resistors 159, 162 and 164 depending on the position of switch 166 which permits either an agitate or spin operation. Zener diode 168 controls the voltage across unijunction transistor 154 and the charging circuit therefor.

Thermistors 170, 172 and 174 in association with capacitor 176, variable resistor 178, resistor 180, thyratron 182 and the operating coil of a magnetic reed relay 184 provide the liquid level sensing arrangement. Thermistors 170, 172 and 174 are positioned at different levels of the clothes tub and switch 186 permits the selection of the thermistor for the level that is desired to maintain.

It is understood, of course, that the inductance or resistance of the circuits of FIGS. 3 and 4 can be utilized in the place of current transformer 148. Also the negative feedback arrangement as described in FIG. 5 can be incorporated into the circuit of FIG. 11 in the place of the current sensing arrangement.

The circuit of FIG. 11 is conveniently utilized in a washing machine such as disclosed in Patent No. 2,950,612 of W. H. Henshaw, Jr. for "Control System for Automatic Washing Machines" and assigned to the General Electric Company.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed as new and desired to be secured by Letters Patent of the United States is:

1. A control arrangement for a D.C. motor powered by a source of full-wave rectified alternating current potential and including an armature, said arrangement comprising a gate controlled rectifier in circuit with said source and said armature, timing means in circuit with said rectifier and said armature for periodically gating said rectifier into conductivity, said timing means including time constant means comprising an RC combination in circuit with said source and said armature and further including a unijunction transistor in circuit with said RC combination and said gate controlled rectifier, and regulating means in circuit with said timing means and said armature, said periods being determined by said regulating means.

2. A control arrangement as recited in claim 1 wherein the periods determined by said regulating means are a function of the value of the counter E.M.F. produced by said armature and of the impedance of said regulating means.

3. The control arrangement defined in claim 1 wherein said regulating means comprises a resistance in circuit with said time constant means and said unijunction transistor.

4. A control arrangement for a D.C. motor powered by a source of full-wave rectified alternating current potential and including an armature comprising a gate controlled rectifier in circuit with said source and said armature, timing means in circuit with said rectifier and said armature for periodically gating said rectifier into conductivity, means in circuit with said timing means and said armature for negatively feeding back current from said armature to said timing means, said periods being a function of the value of said feedback current.

5. The control arrangement defined in claim 4 wherein said timing means comprises time constant means in circuit with said source and said gate controlled rectifier.

6. The control arrangement defined in claim 5 wherein said time constant means comprises an RC combination in circuit with said source and said armature and said timing means further includes a unijunction transistor in circuit with said RC combination and said gate controlled rectifier.

7. The control arrangement defined in claim 6 wherein said RC combination includes a series arrangement of a plurality of capacitances and wherein said feedback is to an intermediate point in said series arrangement.

8. The control arrangement defined in claim 7 wherein said negative feedback means includes a current transformer in circuit with said armature and said capacitances.

9. The control arrangement defined in claim 7 wherein said negative feedback means includes an inductance in circuit with said armature and said capacitances.

10. The control arrangement defined in claim 7 wherein said negative feedback means includes a resistance in circuit with said armature and said capacitances.

References Cited by the Examiner

UNITED STATES PATENTS

| | | | |
|---|---|---|---|
| 2,708,260 | 5/1955 | Comstock | 318—332 |
| 2,792,533 | 5/1957 | Richards | 317—132 |
| 2,916,685 | 12/1959 | Genuit | 318—332 |
| 2,929,968 | 3/1960 | Henisch | 317—132 |
| 2,986,913 | 6/1961 | Condit et al. | 68—12 |
| 3,049,887 | 8/1962 | Sharp et al. | 137—392 |
| 3,095,534 | 6/1963 | Cockrell | 318—331 X |
| 3,123,757 | 3/1964 | Gaudet | 318—327 |
| 3,191,112 | 6/1965 | Cain | 318—246 |

ORIS L. RADER, *Primary Examiner.*

S. GORDON, J. C. BERENZWEIG,
*Assistant Examiners.*